United States Patent [19]

Romacker

[11] 4,416,066

[45] Nov. 22, 1983

[54] ARRANGEMENT FOR ORIENTATION DURING JOURNEYS IN LAND VEHICLES

[75] Inventor: Bertold Romacker, Esslingen, Fed. Rep. of Germany

[73] Assignee: Telefunken Electronic GmbH, Heilbronn, Fed. Rep. of Germany

[21] Appl. No.: 186,252

[22] Filed: Sep. 11, 1980

[30] Foreign Application Priority Data

Sep. 12, 1979 [DE] Fed. Rep. of Germany ....... 2936774

[51] Int. Cl.³ ...................... G01C 22/00; G01C 23/00; G01C 19/00
[52] U.S. Cl. ......................................... 33/318; 33/300; 33/363 K; 73/178 R
[58] Field of Search .............. 33/300, 318, 319, 141.5, 33/1 R, 363 K; 73/178 R; 346/8 R

[56] References Cited

U.S. PATENT DOCUMENTS

| | | | |
|---|---|---|---|
| 1,785,241 | 12/1930 | Bates | 73/178 R X |
| 2,370,000 | 2/1945 | Best | 33/300 |
| 2,504,139 | 4/1950 | Malen | 33/300 |
| 2,533,029 | 12/1950 | McNish et al. | 346/8 R |
| 2,608,094 | 8/1952 | Best | 73/178 R |
| 3,002,282 | 10/1961 | Rumrill | 33/141.5 |
| 3,200,510 | 8/1965 | Hunter | |
| 3,681,752 | 8/1972 | Cuddihy | |
| 3,749,893 | 7/1973 | Hileman | 346/8 |

FOREIGN PATENT DOCUMENTS

| | | |
|---|---|---|
| 764876 | 5/1953 | Fed. Rep. of Germany. |
| 1265431 | 4/1968 | Fed. Rep. of Germany. |
| 1548362 | 10/1969 | Fed. Rep. of Germany. |
| 1551309 | 8/1979 | United Kingdom. |

Primary Examiner—William D. Martin, Jr.
Attorney, Agent, or Firm—Spencer & Frank

[57] ABSTRACT

In an orientation arrangement during journeys in vehicles on land, means are provided for the purpose of ascertaining the distance covered by the vehicle and the changes in the direction of the vehicle. The distance covered by the vehicle and its respective location are ascertained and indicated with the aid of the distance measured and the changes in direction which have been ascertained.

32 Claims, 31 Drawing Figures

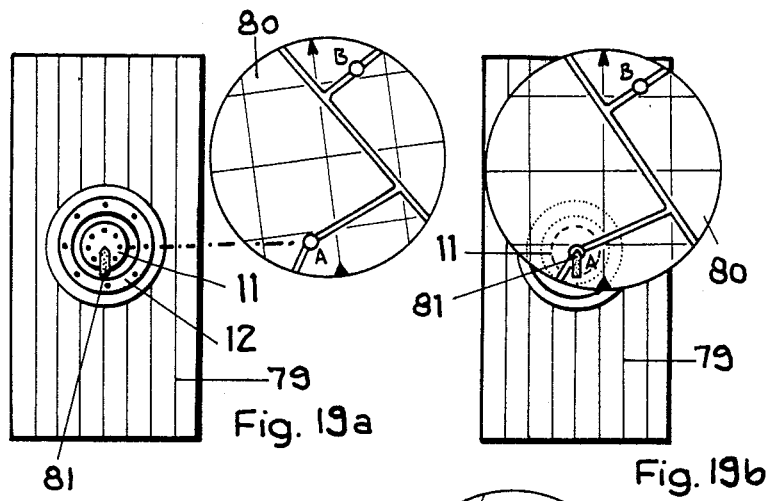
Fig. 19a
Fig. 19b
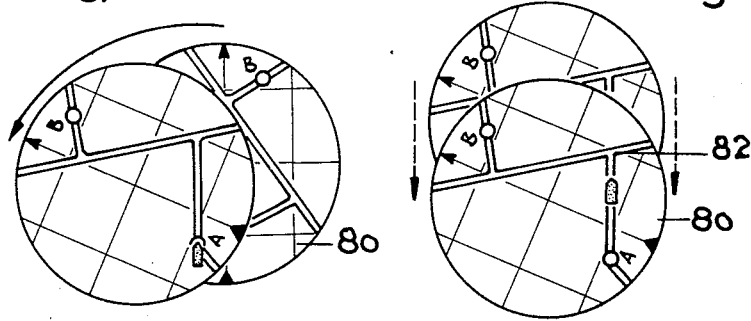
Fig. 19c
Fig. 19d
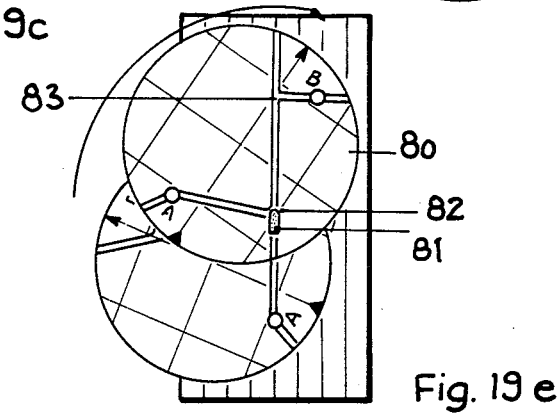
Fig. 19e

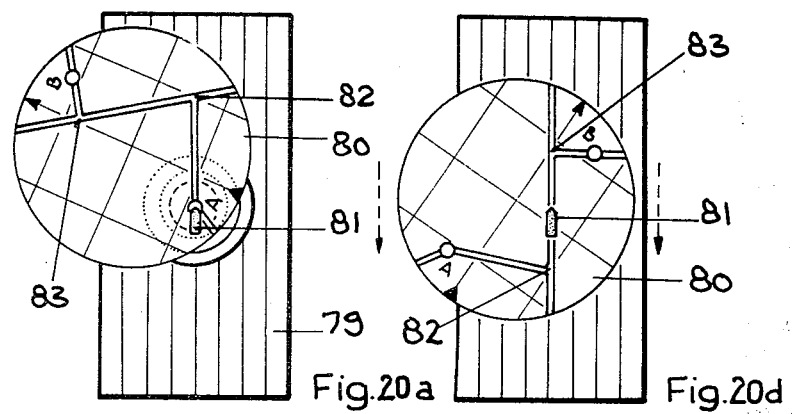
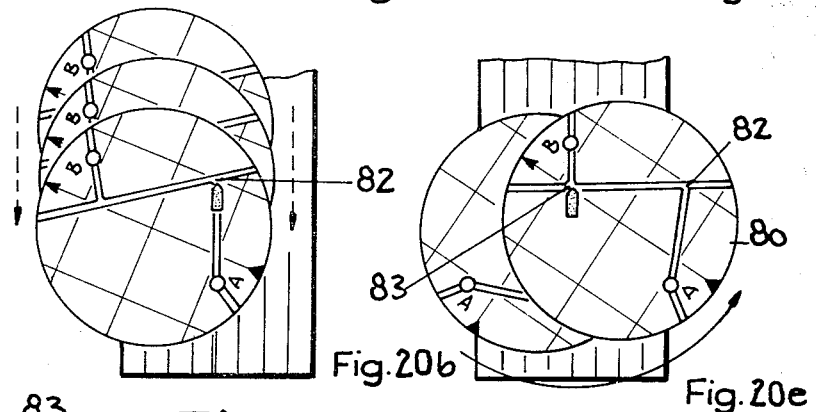
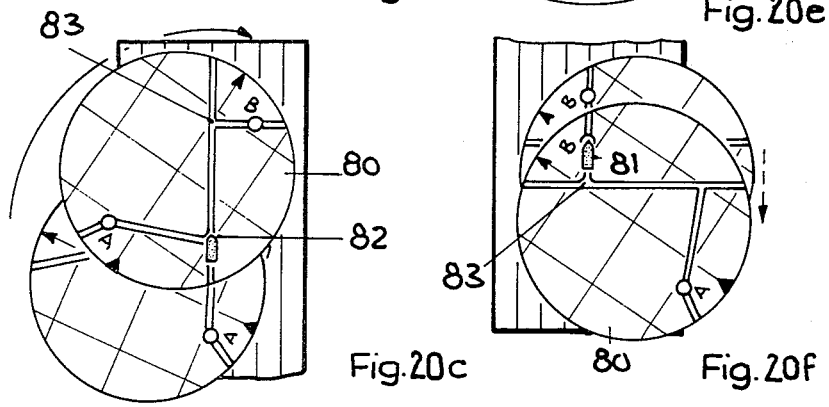
Fig. 20a   Fig. 20d
Fig. 20b   Fig. 20e
Fig. 20c   Fig. 20f

ARRANGEMENT FOR ORIENTATION DURING JOURNEYS IN LAND VEHICLES

BACKGROUND OF THE INVENTION

Motorized vehicles will in future be equipped with so-called information centres which provide considerably more information than the information indicators of the past. In future, not only will we be informed about the speed at which we are travelling, the time and the oil level, but for example we will also be informed about the average speed at which we are travelling, the petrol consumption at a particular moment, the average petrol consumption, the state of the brakes, the coolant level, etc.

In addition there is a need to know continuously during a journey the current position of the vehicle and this information should be made available automatically without it being necessary to search for this information on a street map. An orientation system of this type which automatically indicates the current location of the vehicle during a journey is of considerable importance particularly for the driver travelling alone, since he has to give all of his attention during a journey to the traffic and therefore does not have the opportunity of finding out his position on a map during the journey. Even those people who frequently accompany a driver often find it quite different to ascertain the position of the vehicle at a particular time and this is expecially true during night driving.

Orientation devices are already known which make it possible in a vehicle automatically to ascertain the location during travel without requiring the assistance of a companion in the vehicle. The known orientation device which operate according to various different principles do however have the disadvantage that they require considerable expense which may act as a deterrent to their installation.

SUMMARY OF THE INVENTION

The object underlying the invention is to provide an orientation arrangement during journeys in vehicles on land which can be effected easily and manufactured above all at low cost.

According to the present invention there is provided an arrangement for the purpose of orientation on journeys using land vehicles, comprising means for ascertaining the distance covered by the vehicle and means for ascertaining the changes in direction of the vehicle, the distance covered by the vehicle and/or the current location of the vehicle being ascertained and indicated with the aid of the distance which has been measured and the changes in direction which have been ascertained.

BRIEF DESCRIPTION OF THE DRAWINGS

The invention will not be described in greater detail, by way of example, with reference to the drawings in which:

FIGS. 19a–e, FIGS. 20a–f and FIG. 21 are diagrams for explaining the movements of a map for use in the arrangement according to the present invention.

DESCRIPTION OF THE PREFERRED EMBODIMENT

An orientation device according to the invention requires a device which makes it possible to ascertain the deviation in the angle of the longitudinal axis of the vehicle from a certain direction during changes in direction, a device for ascertaining the distance covered, and a device which converts these values which have been ascertained into corresponding rotary or translational movements in an indicator device. Ascertaining changes in direction of the vehicle is carried out by means of a device in the vehicle which does not itself make these changes in direction which the vehicle makes and therefore remains stable in its direction during travel. Such a device is shown in FIGS. 1 to 4 and preferably comprises a mass body 1 mounted substantially free of friction on an axle 3. The friction-free mounting of the mass element 1 is obtained for example by means of magnetic, aerostatic or hydrostatic bearings.

Figure 1:
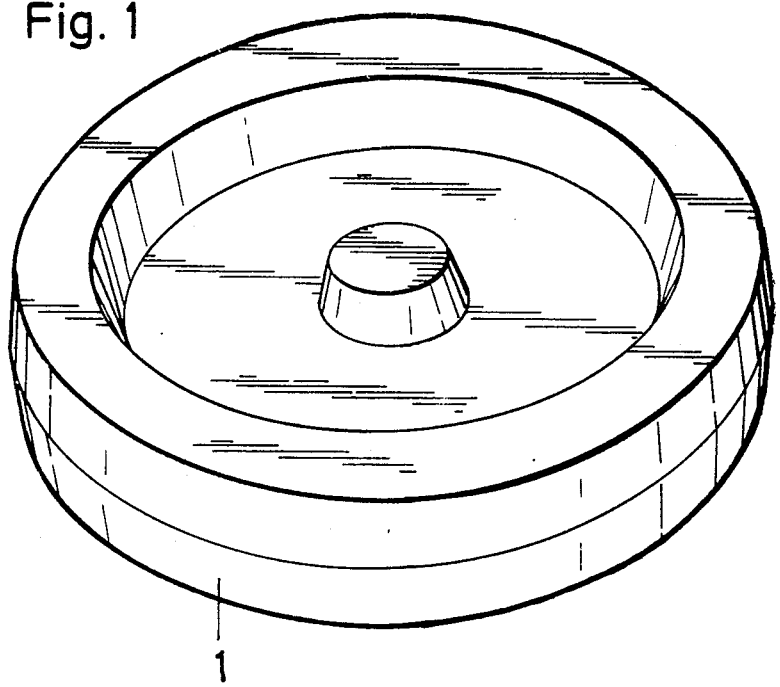
FIG. 1 is a perspective view of an inertial mass for use in an arrangement in accordance with the present invention.
Figure 2:
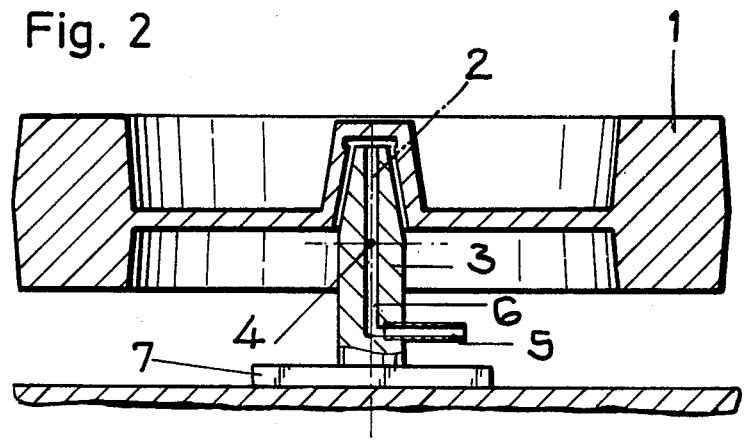
FIG. 2 is a cross-sectional view of an aerostatic bearing for the inertial mass of FIG. 1.
Figure 3:
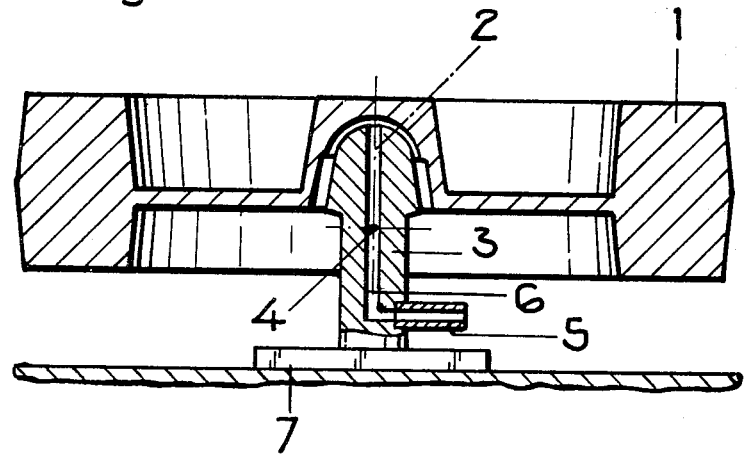
FIGS. 3 and 4 are cross-sectional views of alternative aerostatic bearings for the mass of FIG. 1.
Figure 4:
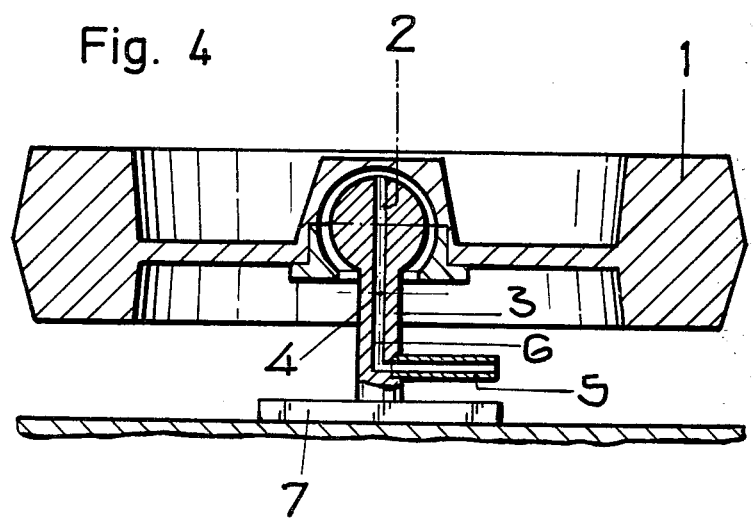

FIGS. 2 to 4 show arrangements with aerostatic bearings. In the embodiment of FIG. 2, the mass element 1 automatically has to make longitudinal and transverse inclinations with the vehicle because of the type of mounting. This is not the case in the embodiments of FIGS. 3 and 4 because in these embodiments the mass element 1 is able to swing to and fro because of the use of rounded hemispherical or cup bearings. The device of FIG. 4 has a double-sided hemispherical bearing in contrast to the devices of FIGS. 2 and 3. This double-sided hemispherical bearing has the advantage as compared to the bearings of FIGS. 2 and 3 that the mass element 1 is not able to "lift away" when travelling on poor quality roads and over potholes in the road.

In FIGS. 2 to 4, the pivot point 2 of the bearing of the mass element 1 mounted on the axle 3 has to be above the centre of gravity 4 of the mass 1. The most suitable spacing between the bearing pivot point 2 and the centre of gravity 4 may be ascertained by means of tests or by calculation. The mass element 1 is disc-shaped and strengthened substantially at its edge in order to give the said element 1 the required moment of inertia of its mass whilst keeping the weight not too high.

The supply of compressed air required for an aerostatic bearing is provided by means of the compressed air connection 5 and the air channel 6. The required compressed air is taken for example from the compressed air system of the vehicle or is produced in a compressor. The mass element 1, together with its axle 3, are arranged on a base 7 located in the vehicle, which may be the base of the boot of the vehicle, for example.

Figure 5:
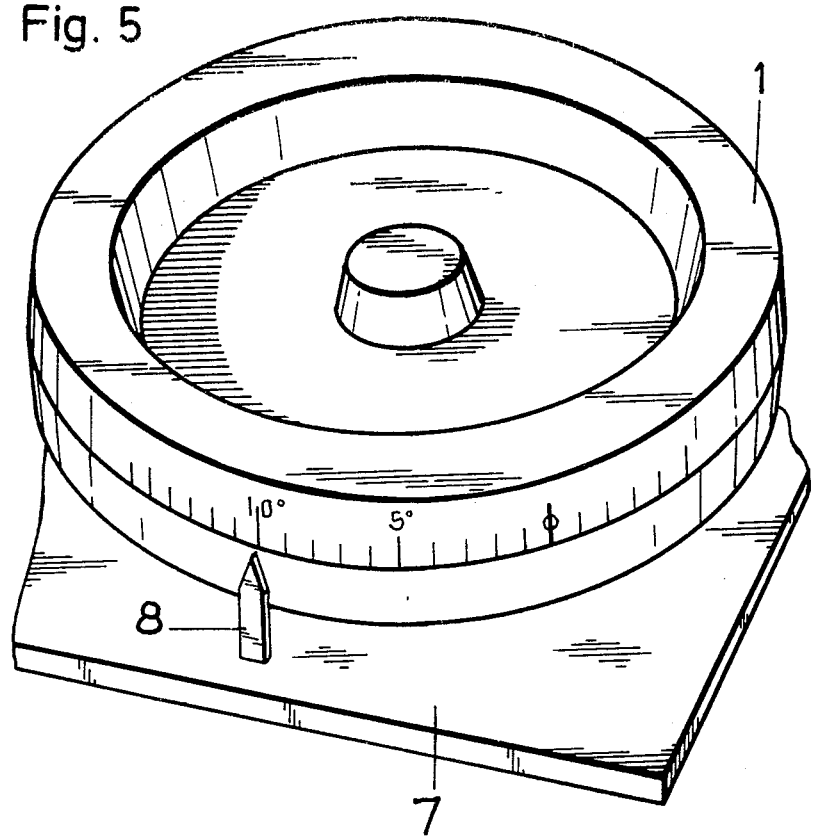
FIG. 5 is a perspective view of an inertial mass with an associated direction indicator.

As already stated, the deviations in the angle of the longitudinal axis of the vehicle during a journey from a fixed and predetermined direction are to be ascertained. The changes in direction of the vehicle may be ascertained according to FIG. 5 by means of a direction indicator 8 for example connected rigidly to the vehicle and rotating about the mass element 1 when there are changes in the direction of the vehicle, the rotary movements carried out by the direction indicator corresponding to the changes in direction of the vehicle. In order to be able to detect the direction changes of the vehicle in terms of their magnitude, the mass element 1 of FIG. 5 is provided with angular divisions which are divided up into 360°, for example. The mass element 1 is so adjusted in terms of its direction that the zero point of the angular divisions present at its edge point indicates a predetermined direction. The predetermined direction is preferable to the north since maps are orientated to the north, as is known. Since the mass element 1 does not also make the changes in direction made by the vehicle, the marking or the zero point of the angle divisions arranged on the mass element always points, with north orientation, towards the north during a journey. The angular divisions indicated by the direction indicator 8 are deviations in angle from the north direction when orientation is carried out according to the north. If the longitudinal axis of the vehicle deviates 10° from the north direction as a result of direction changes for example, as shown in FIG. 5, then the direction indicator 8 which is a conventional pointer in the embodiment of FIG. 5, makes an angular movement of 10° about the mass element 1 and travels to the 10°-mark of the angular divisions present on the mass element.

Figure 6:
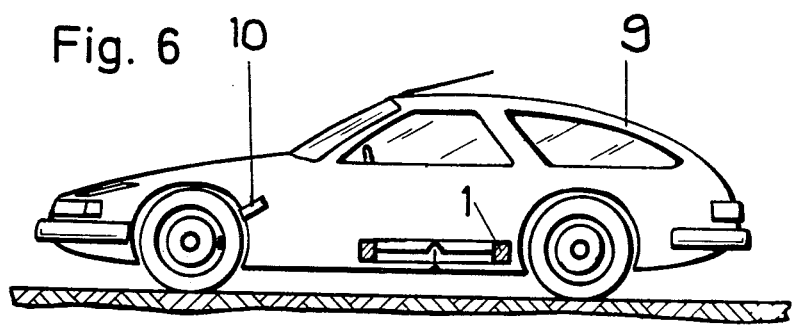
FIG. 6 is a side view of a car showing schematically how the inertial mass of the previous Figures is mounted.

FIG. 6 shows symbolically how the mass element 1 used to ascertain the direction changes is housed in a car 9. The distance indicator 10, which is a pulse counter for example, indicates symbolically that the distance covered by the vehicle is ascertained with the aid of the number of wheel rotations of the vehicle.

Figure 7:
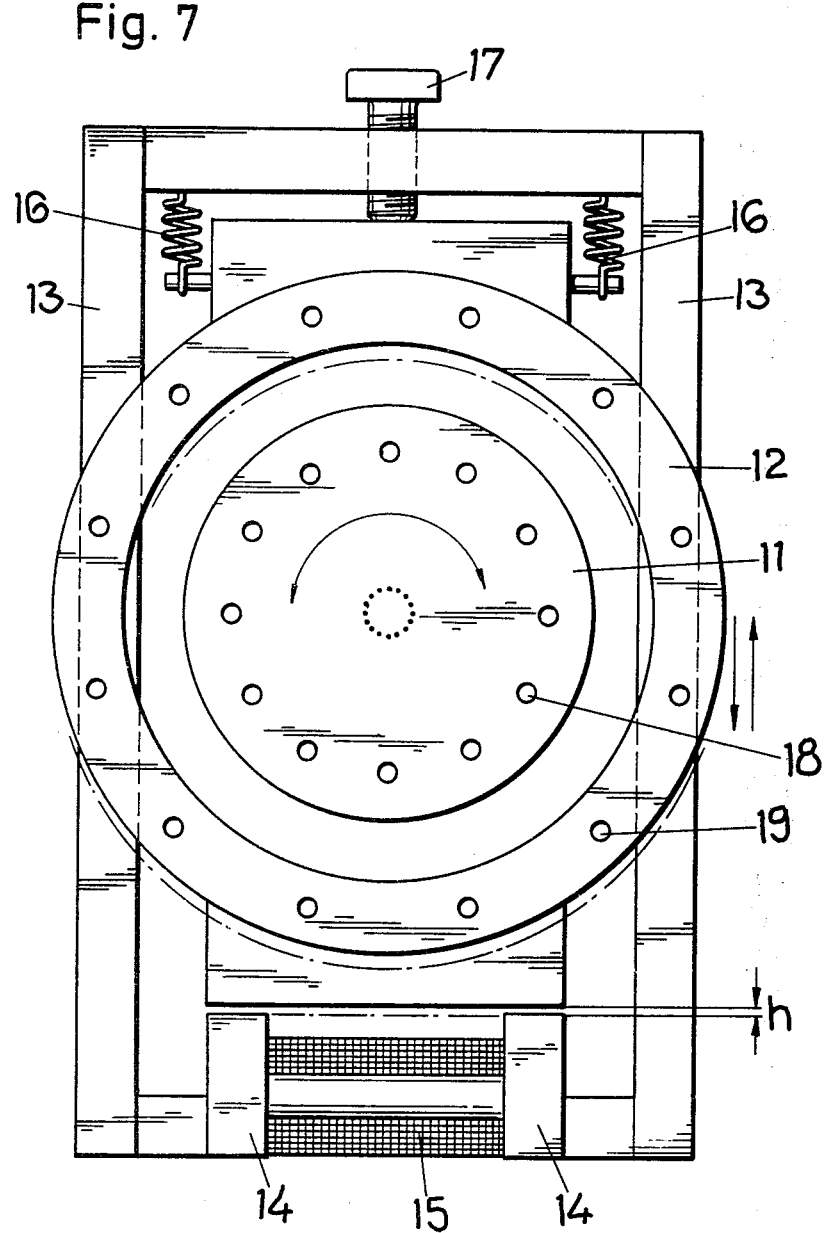
FIG. 7 is a plan view of a device for moving a map for use with the arrangement according to the present invention.

FIG. 7 shows a device which rotates a street map in accordance with the direction changes of the vehicle and displaces it laterally in accordance with the distance covered by the vehicle. A turntable 11 which carries out exactly the same rotary movement as the direction indicator 8 in relation to the mass element 1 when there is a change in the direction of the vehicle, is located in the centre of this device. Lateral displacement of the map, proportional to the distance covered by the vehicle, is brought about my means of an annular lateral transport device 12 which surrounds the turntable 11. The support or frame 13 serves as a longitudinal guide for the lateral transport device 12 during its lateral displacement.

The lateral displacement of the lateral transport device 12 is brought about for example by means of an electromagnet comprising the magnet yoke 14 and the magnet coil 15. This electromagnet receives electrical pulses continuously during the journey and these cause the lateral transport device to be attracted by the electromagnet and thus displaced towards the electromagnet. The number of pulses and the size of the lateral displacement are selected so that the resultant displacement corresponds to the distance covered by the vehicle. Return springs 16 ensure that the lateral transport device 12 always returns to its starting position when the electromagnet is not applying any attraction force to it. The lift "h" of the stroke or lateral transport device 12 during each pulse to the electromagnet 14,15 may be set by the stop screw 17.

Both turntable 11 and the lateral transport device 12 are provided with suction openings which have the reference number 18 in the case of the turntable 11 and the reference number 19 in the case of the lateral transport device 12. These suction openings 18 and 19 serve to attract and hold a street map against the turntable 11 or the lateral transport device 12, respectively with the aid of suction air.

The turntable 11 and the lateral transport device 12 apply suction to the street map alternatively and so as to overlap in order to prevent the map falling down. The lateral transport device 12 is displaced basically laterally in two directions, firstly in the direction of the electromagnet 14, 15 and then in the opposite direction when it returns into its starting position. The street map located on the lateral transport device 12 can only carry out the lateral displacement in one direction however, since a displacement of the map in the opposite direction would cancel out the previous lateral dis-placement so that the map would in the final analysis have no lateral displacement at all. This means that the map may only be held via suction by the lateral transport device 12 during displacement in one direction, while the lateral transport device is not able to to apply suction to the map during displacement in the opposite direction—usually the direction of return to the starting position. In order to prevent the map from being carried along undesirably when the lateral transport device 12 is displaced laterally in the opposite direction, the map is preferably retained by the turntable 11 during this lateral movement in this opposite direction, e.g. by suction.

When the lateral transport device 12 moves laterally, the map is gradually displaced laterally in one direction while lateral displacement of the map in the opposite direction is prevented. Changes in direction of the vehicle only have an effect on the turntable 11 which carries out the same rotation relative to the lateral transport device 12 as the direction indicator 8 and during rotation also rotates the map located thereon accordingly when the map is held via suction by the turntable 11 during rotation but not by the lateral transport device 12. When the turntable 11 rotates, the map always rotates with it, while when there is lateral displacement of the lateral transport device 12 there may only be a corresponding lateral displacement of the map in one direction.

Overall, the following applies to the suction processes. When the map is intentionally laterally displaced it may only be applied with suction by the lateral transport device 12 and not by the turntable 11. When the lateral transport device 12 is displaced laterally and the map is not able to be displaced with it, the map is under suction from the turntable 11 but not from the lateral transport device 12. When the turntable 11 rotates in order to rotate the map according to the direction change of the vehicle, the map may only be under suction from the turntable 11 but not from the lateral transport device 12. The lateral transport device 12 may therefore only apply suction when the electromagnet 14, 15 receives pulses for displacing the lateral transport device 12.

The electrical pulses with which the electromagnet 14, 15 is fed are derived from the rotations of the vehicle wheel for example. Thus a pulse may be triggered by each rotation of the wheel for example and this pulse cannot be passed directly to the electromagnet 14, 15 but rather care must be taken that there is a certain relationship between the number of pulses delivered by one or more vehicles wheels and the number of pulses arriving at the electromagnet 14, 15, this relationship taking into account the scale of the map and also other factors.

The following relationships apply:

$$a \cdot n = E \qquad (1)$$

$$h \cdot m = E/M \qquad (2)$$

$$h = a \cdot n / M \cdot m \qquad (3)$$

where a is the circumference of the vehicle wheel, n is the number of wheel rotations made by the vehicle as it covers a certain distance, E is the distance covered by the vehicle, h is the stroke or lift of the lateral transport device, m is the number of pulses for the electromagnet, and M is the scale of the street map used.

If, for example, after the vehicle has covered a distance of 300 meters the electromagnet 14, 15 is acted upon by a pulse, than there is the following stroke or lift h per pulse for the lateral transport device 12:

$$h = a \cdot n / M = 300/M.$$

When using a street map with a scale ratio of 1:300 000, the lift or stroke h is $300/300\,000 = 10^{-3}m = 1$ mm for example.

Figure 8:
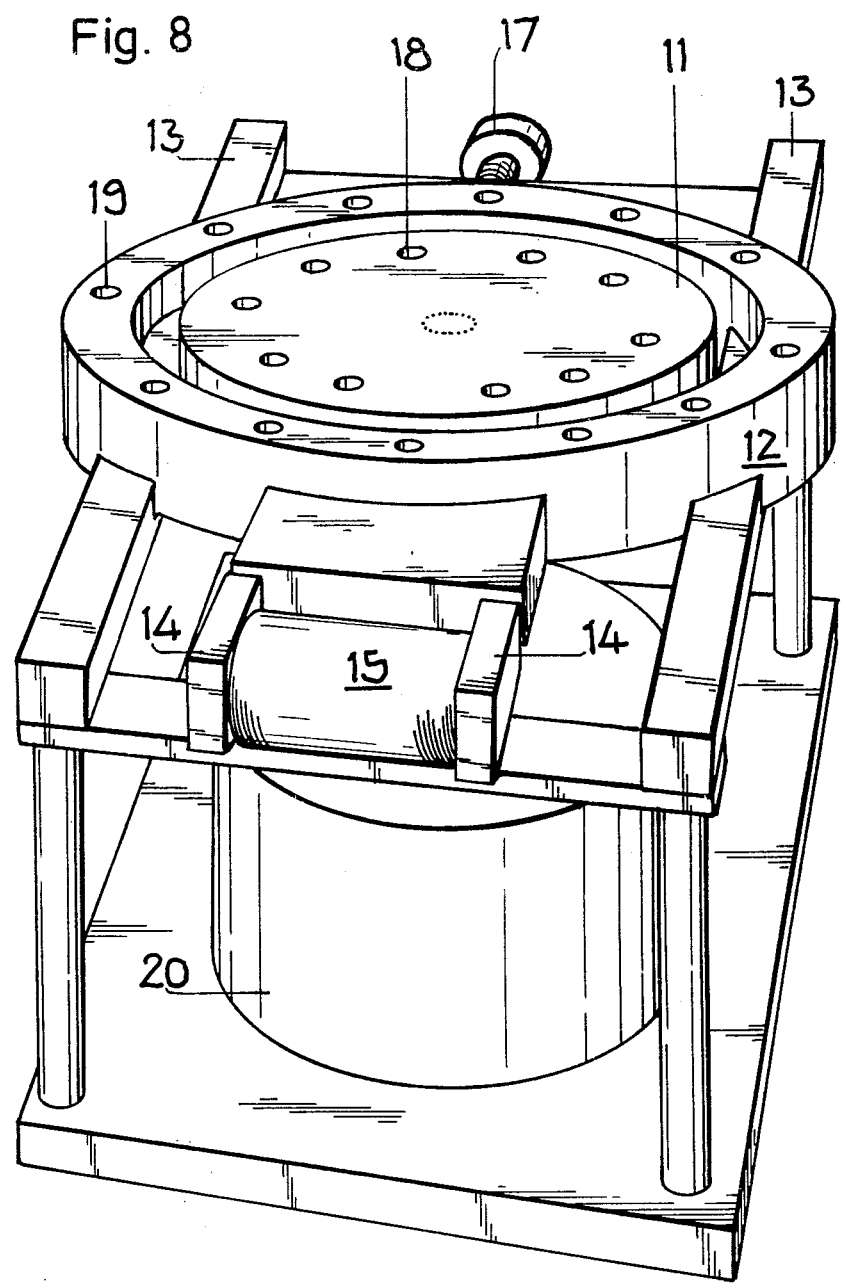
FIG. 8 is a perspective view of the device of FIG. 7.
Figure 9:
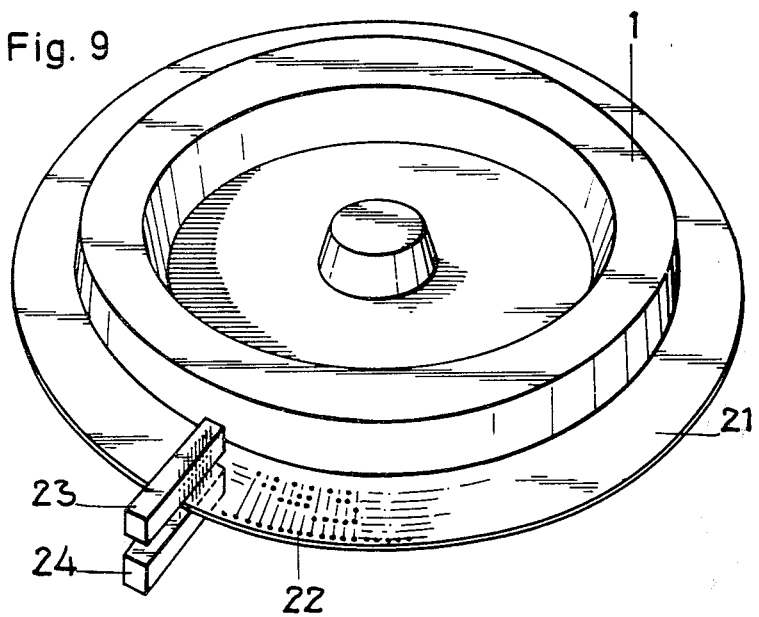
FIG. 9 is a perspective view of an inertial mass for use in an arrangement in accordance with the present invention and showing how positional information relating to the mass is encoded.

FIG. 8 shows the device of FIG. 7 serving to displace the map in polar coordinates, in perspective view. This view shows above all the guidance of the lateral transport device 12 by the frame support 13. As FIG. 8 also shows, the turntable 11 is driven by a step motor 20 which, with a certain angular rotation of the direction indicator 8 relative to the mass element 1, receives a pulse which rotates the step motor 20 and also rotates the turntable 11 connected to thereto by the same angle by which the direction indicator 8 was previously rotated.

Whereas FIG. 5 merely shows how the direction change of the vehicle may be fixed by ascertaining the corresponding relative movement of the direction indicator 8 as compared to the mass element 1 which is stable in direction, FIGS. 9 to 13 relates to the problem of controlling the step motor 20 which, as stated above, has to perform angular rotations which are identical to the angular rotations of the direction indicator 8. Moreover, the step motor 20 always has to rotate in the same direction as the direction indicator 8 relative to the mass element 1, i.e. clockwise or oppositely of this direction of rotation.

This type of control may be carried out in various ways. One embodiment is shown by way of example by FIG. 9. In this embodiment, the mass element 1 is provided with an edge surface 21 having a punched tape coding 22 which is scanned by a punched tape reader. The punched tape reader comprises alight-emitting diode transmitter 23 for example and a photoelement receiver 24 for example. The punched tape reader 23, 24 rotates in the same way as the direction indicator 8 of FIG. 5 rotates about the mass element 1 when there is a change in the direction of the vehicle. The coding on the edge surface 21 of the mass element 1 must be such that a certain angular rotation of the punched tape reader 23, 24 results in a corresponding angular rotation of the turntable 11. If, by way of example, each angular rotation of the punched tape reader of 1° should result in an angular rotation of the turntable of 1° also, then 360 different codings would be required on the edge 21 of the mass element in order that a different coding should be present on each portion having an angle of 1°. 360 different codings necessitate a nine-position binary code which can be scanned with a punched tape reader having a 9-bit LED line as the transmitter and a nine-part photoelement line as the receiver 24. Scanning is effected by making the nine LEDs transmit light which is directed on to the punch hole coding. However, since the hole coding is different from one radian to the next, the photoelements on the receiving side are activated selectively depending on the respective coding present between the transmitter and receiver. This has the result that a special configuration of activated photoelements is associated with each radian. A nine-part phototransistor line of the following type: BPW 16/9 or BPW 17/9 serves as the photoreceiver.

Figure 10:
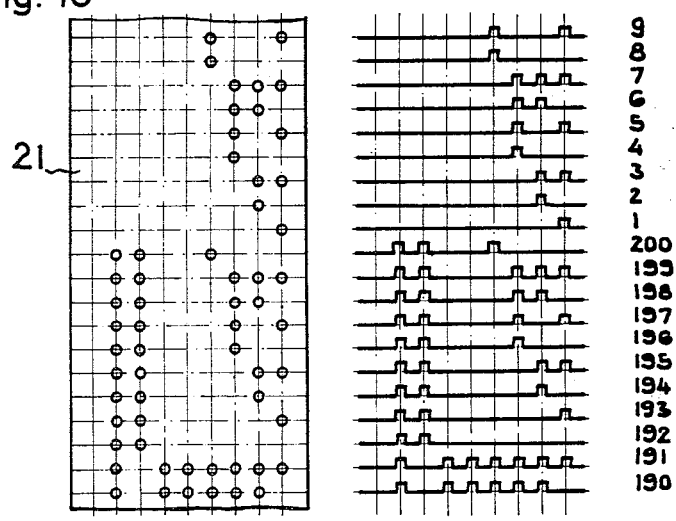
FIG. 10 is a diagram for explaining the operation of the encoding arrangement of FIG. 9.

FIG. 10 shows the nine-position binary code present on the edge surface 21 of the mass element 1 in enlarged form.

Figure 11:
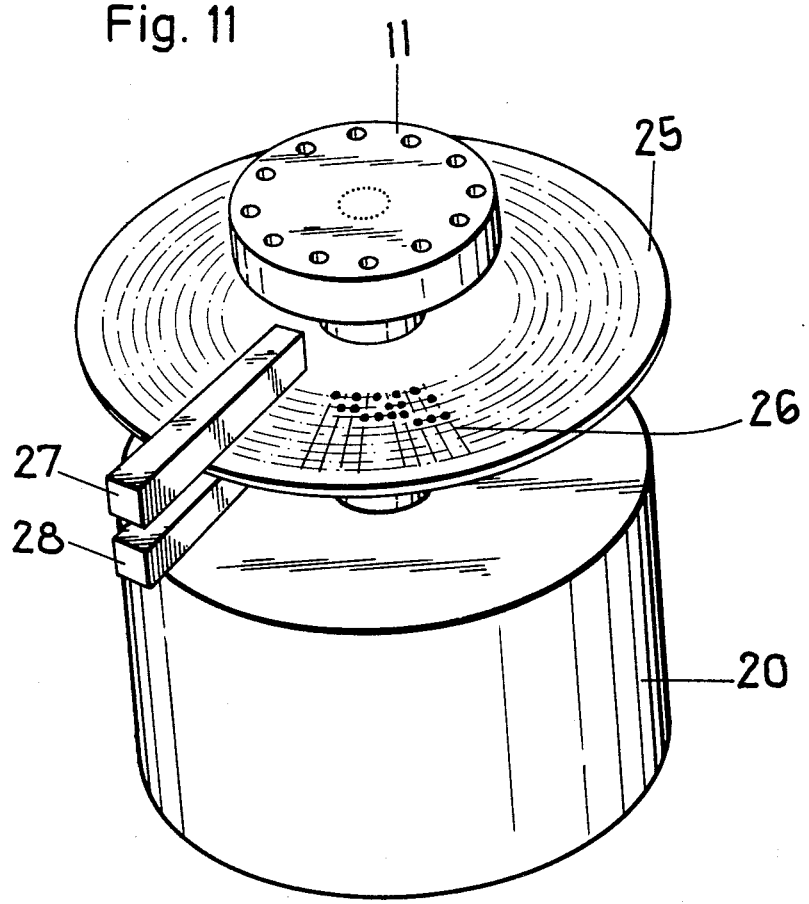
FIG. 11 is a perspective view of a device for rotating a map, showing how information relating to the position thereof is encoded.

As FIG. 11 shows, a disc 25 is connected to the axle of the step motor 20 and carries out the same rotations as the turntable 11 and has the same coding (26) as the edge surface 21 of the mass element 1. This coding 26 is also scanned by a punched tape reader which is constructed in the same manner as the punched tape reader of FIG. 9 and comprises a light-emitting diode transmitter 27 and a photoelement receiver 28. A nine-position LED line is preferably used as the transmitter 27 and a nine-position photoelement line as the receiver 28 for this punched tape reader.

Figure 12:
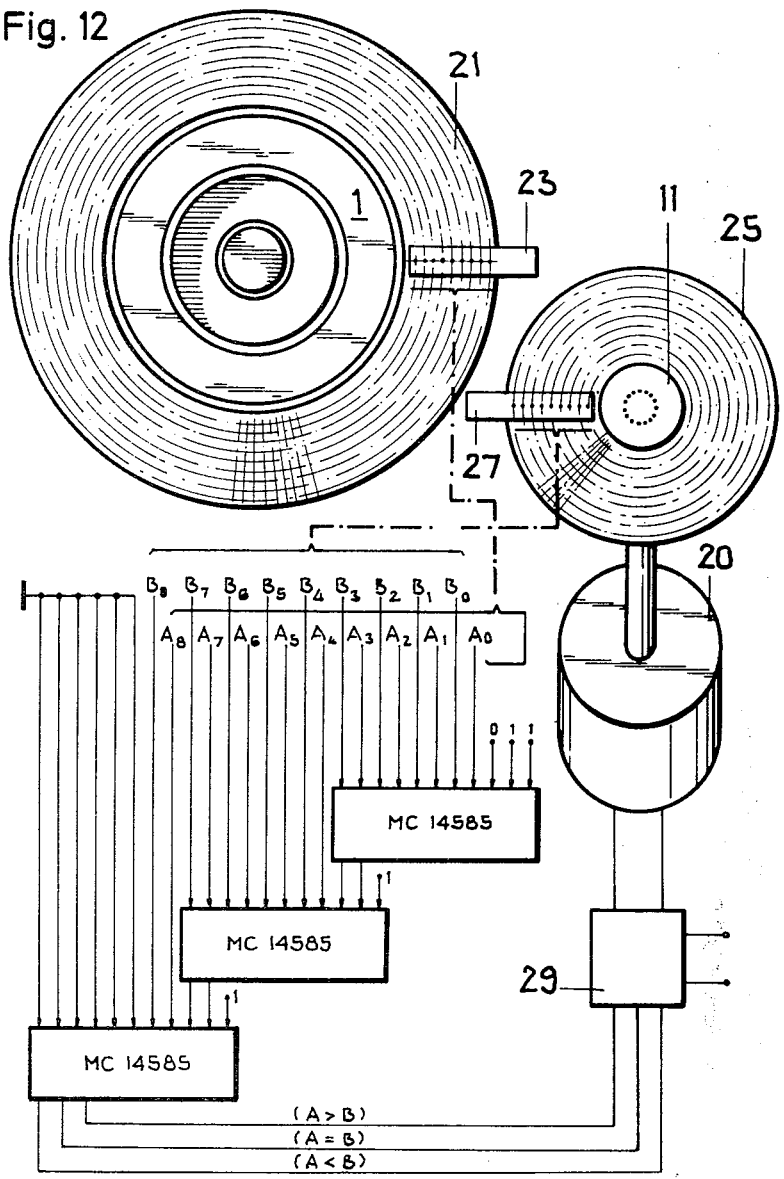
FIG. 12 is a schematic diagram of a comparator for comparing the outputs of the encoding arrangement of FIGS. 9 and 11.

The two punched tape receivers 24 and 28 gives results which are compared to each other as indicated in FIG. 12 when the punched tape is read. If the two results are the same then the step motor 20 does not receive a pulse and the turntable 11 is not set in rotation either. There is no rotation only when both punched tape readers take up the same angle position with respect to the zero making, i.e. both in the angle position 10° for example. On the other hand, if one punched tape reader should take up the angle position 10° and the other punched tape reader the angle position 350°, then despite a common angle deviation of 10° in each case from the zero point there would be rotation of the turntable 11 since the device can distinguish between the angle position 350° and the angle position 10° because of different coding.

If the results from the two receivers 24 and 28 differ from each other, the disc 25 is rotated by the step motor 20 until the two results from the receivers coincide. This rotation causes both punched tape readers to be remote from their zero position by the same angle and to take up the same position.

Comparison of the receiver data is carried out according to FIG. 12 by means of a comparator which has three outputs, one output for A<B, one output for A=B and one output for A>B. Such a comparator comprises the cascade circuit of three four-but comparators for example according to FIG. 12. A suitable 4-bit comparator is supplied for example by the Motorola Company and the type number is MC 14585. The nine inputs $A_0$ to $A_8$ of the cascade comparator circuit are associated for example with the nine photoelements of the receiver 24, while the nine inputs $B_0$ to $B_8$ are then associated with the nine photoelements of the receiver 28.

A and B correspond to the digital number of each coding. If, for example, the conventional angle division into 360° is used—a different angular division may of course be implemented—then 360 different codings with 360 different digital numbers are present. The comparator can recognize whether the digital number which emanates from the coding of the mass element 1 and corresponds to a certain angle position, is greater or less than the digital number which emanates from the coding for the turntable 11 and also corresponds to a certain angle position. Depending on whether the difference between the two digital values is positive or negative the turntable 11 either rotates to the left or to the right and rotates until both digital values are equal (A=B) so that there is coincidence with respect to their angle position. The circuit 29 serves to provide the required electrical supply pulse to the step motor 20 to cause same to move to the proper position.

Figure 13:
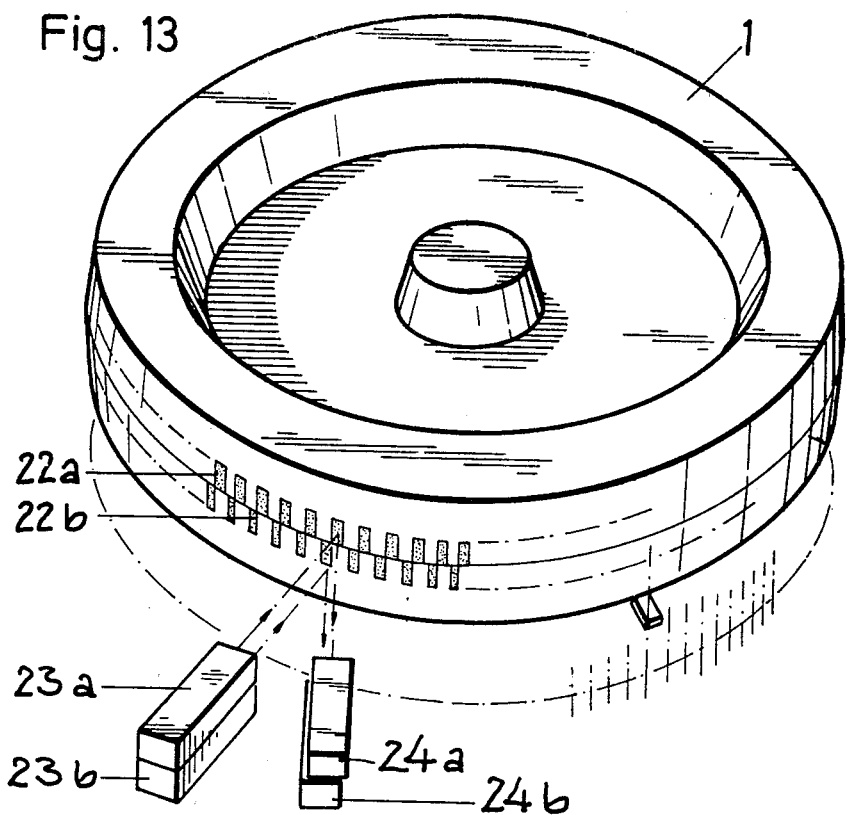
FIG. 13 is a perspective view of an inertial mass for use in an arrangement in accordance with the present invention and showing a further embodiment of how information relating to the change of direction of the vehicle is encoded.

FIG. 13 shows a further embodiment for controlling the rotary plate 11 depending on the change of direction of the vehicle. While the previously explained angle coding is a punched hole coding, FIG. 13 shows a black/white coding which is arranged at the edge or periphery of the mass element 1.

The coding of FIG. 13 comprises two offset black/-white codings 22a and 22b. The scanning of the upper coding 22a is carried out by the transmitter 23a and reception of the reflected radiation is carried out by photoreceiver 24a, l while the lower coding 22b is scanned by transmitter 23b and the reflected radiation is received by the photoreceiver 24b. The transmitters 23a and 23b comprise for example a light-emitting diode and the photoreceivers 24a and 24b comprise for example a phototransistor.

In the case of a change in the direction of the vehicle, the two transmitters and receivers 23a, 23b and 24a, 24b, respectively, are rotated about the mass element 1 in accordance with the direction change carried out by the vehicle. The pulse trains supplied to the receivers 24a and 24b are offset with respect to each other. These offset pulse trains are supplied to an arrangement having two inputs and two outputs and having the property that when two pulse trains displaced from each other in terms of time are fed in, it only delivers one pulse train to one of its two outputs in each case. A signal should only appear at one output if the first pulse train lags behind the second pulse train, while a signal should only occur at the other output if the second pulse train lags behind the first pulse train. In this way, it is possible to differentiate between the directions of rotation, i.e. is possible to tell whether the transmitter and receiver units are rotating in one direction or in the other direction about the mass element. The step motor may be rotated accordingly in one direction or the other and in fact this depends on whether the one output or the other output delivers the signal for the step motor.

Figure 14:
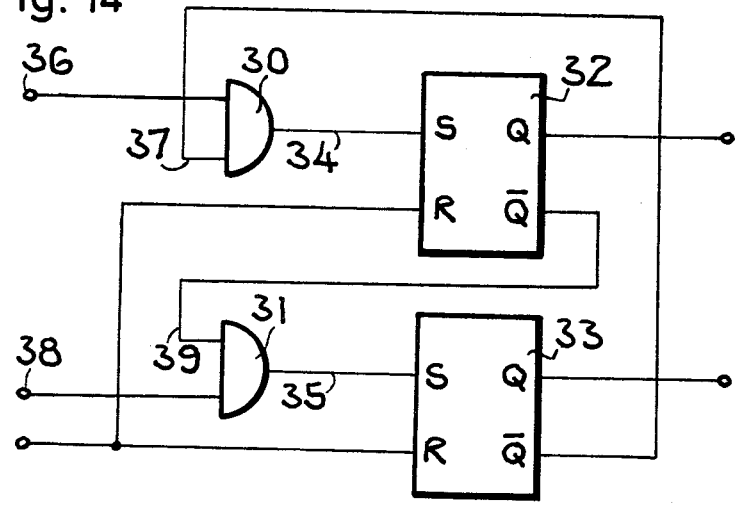
FIG. 14 shows a circuit for use with the encoding arrangement of FIG. 13.

FIG. 14 shows an embodiment for a circuit arrangement which converts two pulse trains offset from each other in terms of time into one pulse train which, depending on whether the first pulse train lags behind the second pulse train or vice versa, delivers a pulse train to one or other output; this pulse train which is delivered corresponds to the change in direction of the vehicle and controls the step motor 20 in accordance with the change in direction of the vehicle.

The arrangement of FIG. 14 comprises the two AND-gates 30 and 31 and the two RS Flip-flops or trigger stages 32 and 33.

While one input of the trigger stage 32 serves as a reset input, the set input of this trigger stage is connected to the output 34 of the AND-gate 30. The same is true of trigger stage 33, one input of which also serves as a reset input and the set input of which is connected to the output 35 of the AND-gate 31. One pulse train is supplied to one input 36 of the AND-gate 30 whose other input 37 is connected to the output $\overline{Q}$ of the trigger stage 33. The other pulse train controls one input 38 of the AND-gate 31 whose output 35 is connected to the set input of the trigger stage 33. Depending on which of the two pulse trains lags behind the other either a signal appears at output $\overline{Q}$ of trigger stage 32 or at output Q of trigger stage 33.

As already stated, the number of revolutions of the wheel of the vehicle serves as an indicator for the distance covered by the vehicle. It is possible to ascertain the distance covered by the vehicle by knowing the circumference of the wheel and by determining the number of revolutions per wheel; a pulse is triggered on each revolution of the wheel for example and these pulses are used to displace the street map in the lateral direction. However, since the street map is not to be displaced laterally during each revolution of the wheel, but only after a certain distance, the pulses triggered during each revolution of the wheel cannot be passed on directly to the advance device for displacing the street map but rather it is necessary to have a programmable divider which divides up the number of pulses into a certain ratio and only passes on a pulse to the advance or feed device after a certain number of pulses.

Figure 15:
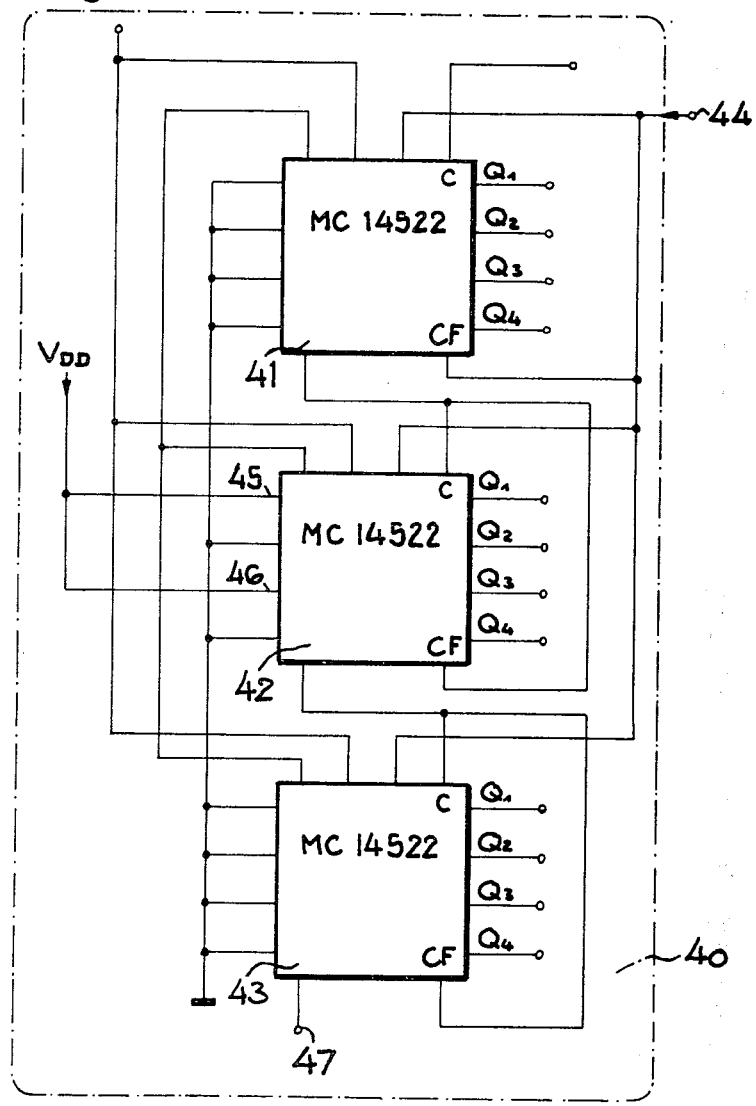
FIG. 15 shows a programmable divider for use in an arrangement according to the present invention.

FIG. 15 shows such a programmable divider 40 which produces a single pulse from a certain number n of pulses. The programmable divider 40 of FIG. 15 comprises the cascade circuit of a units stage 41, a tens stage 42 and a hundreds stage 43. The individual stages may for example be dividers of the following types: MC 14522 or MC 14526. The pulses derived from the revolutions of the wheel are supplied to the input 44 of the cascade circuit.

The desired divider ratio is set in binary coded form at the present inputs. In the embodiment of FIG. 15, a divider ratio of 50:1 is set while a potential $V_{DD}$ is applied in each case to the present inputs 45 and 46 of the tens stage 42, while the remaining present inputs are connected to earth. With a divider ratio of 50:1 a distance pulse appears at output 47 of the programmable divider 40 after 50 pulses have been fed into input 44. This distance pulse serves to control the electromagnets and thus the advance for lateral displacement of the street map. Any desired divider ratios may be set at the present inputs of the programmable divider 40.

Since in the device of FIG. 7 rotation and lateral displacement of the street map are not intended to take place simultaneously, care must be taken that rotation pulses and distance pulses do not arise at the same time. This object is achieved for example by the circuit of FIG. 16 which comprises the EXCLUSIVE/OR gate 48 and the two AND-gates 49 and 50. In this circuit the rotation pulses for example are supplied to the input 51 of the EXCLUSIVE/OR-gate 48 and to the input 52 of AND-gate 49. The distance pulses on the other hand are applied to the input 53 of the EXCLUSIVE/OR gate 48 and to the input 54 of the AND-gate 50. The output 55 of the EXCLUSIVE gate 48 is connected to the input 56 of the AND-gate 49 and the input 57 of the AND-gate 50.

Figure 16:
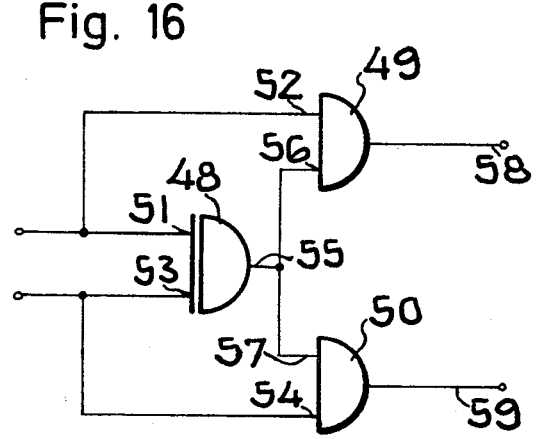
FIG. 16 shows a circuit for use in an arrangement according to the present invention for preventing the simultaneous transmission of two pulses.

In the circuit of FIG. 16 the rotation pulse at the output 58 of the AND-gate 49 only appears if there has been no incoming distance pulse at the same time. Similarly, a distance pulse only appears at the output 59 of AND-gate 50 if a rotation pulse is not present at the same time. The circuit of FIG. 16 therefore prevents rotation and distance pulses occuring at the same time from being passed on but at the same time ensures that rotation and distance pulses which occur separately of each other are not prevented from being passed on.

Figure 17:
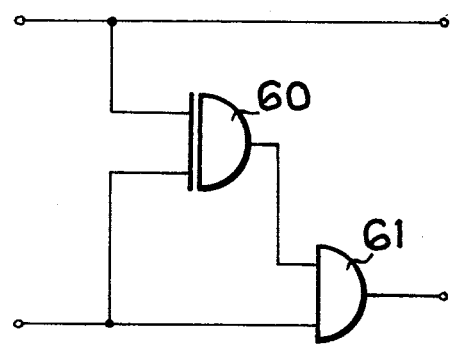
FIGS. 17 and 18 show alternative circuits to that of FIG. 16.

The circuit of FIG. 17, which comprises an EXCLUSIVE/OR gate 60 and an AND-gate 61, has the advantage as compared to the circuit of FIG. 16 that when a rotation pulse and a distance pulse come together one of these two pulses is passed on so that both pulses are not stopped.

The circuits of FIGS. 16 and 17 in fact prevent both pulses from being passed on when rotation and distance pulses occur at the same time. However, these circuits do not prevent loss of that pulse which is not passed on when they occur at the same time. This disadvantage of the circuits of FIGS. 16 and 17 can be overcome however if a memory is provided in accordance with a further refinement of the invention which stores that one of the two pulses (and only releases it after intermediate storage) which is not passed on initially when they occur at the same time. An example of such a circuit having a memory which first of all ensures that pulses occuring at the same time are not passed on at the same time, and secondly ensures that the pulse which is not passed on is initially stored in intermediate manner and only passed on subsequently, is shown in FIG. 18.

Figure 18:
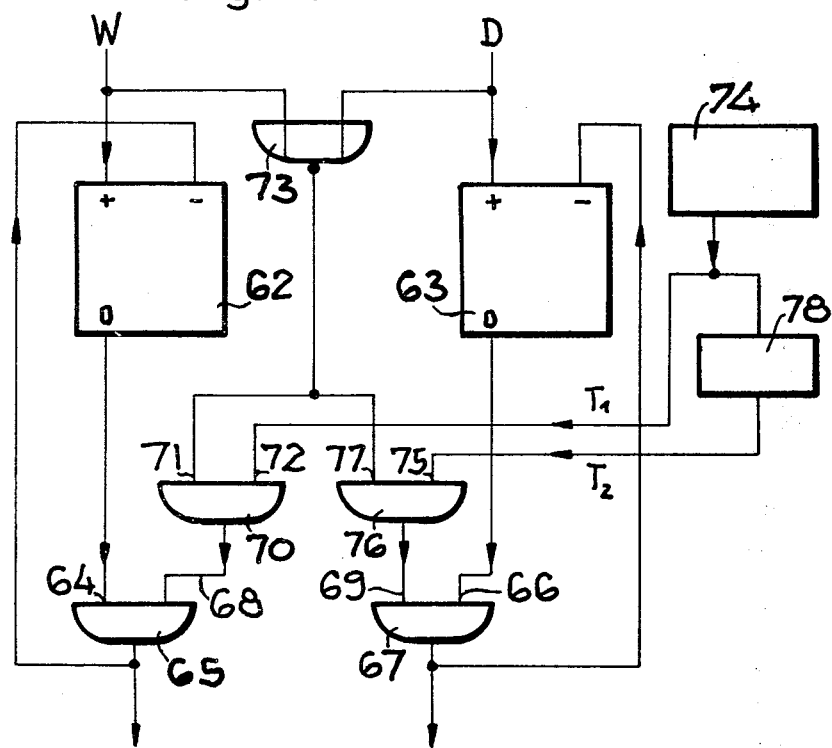

In the circuit of FIG. 18, both the distance pulse and the rotation pulse are stored in an intermediate counter for an intermediate period. The distance pulse W is read into the forward/backward counter 62 and the rotation pulse D is read into the forward/backward counter 63. In its idling state, i.e. when there is no pulse stored in the counters 62 and 63, a 0 appears at the counter outputs. When one or more pulses are being stored, however, a 1 appears at the output of the counter in which a pulse is stored.

According to FIG. 18, a 1 at the output of the counter 62 also appears at the input 64 of AND-gate 65 and a 1 at the output of counter 63 also appears at the input 66 of AND-gate 67. The 1 at the inputs 64 and 66 of the output gates 65, 67 is passed on however only if a 1 appears at the second inputs 68, 69 of these output gates respectively. Since the input 68 of the output gate 65 is controlled by AND-gate 70, a 1 appears at the input 68 of the output gate 65 only if a 1 is applied to the two inputs 71 and 72 of the AND-gate 70. This is the case if a 1 reaches the input 71 of the gate 70 from the NOR-gate 73 and if a shift clock pulse $T_1$ reaches the input 72 of the gate 70 from a clock generator 74. The NOR-gate 73 however does not deliver a 1 if a distance pulse and a rotation pulse arrive at the same time at the inputs to the circuit. In this way the NOR-gate ensures that distance and rotation pulses cannot have an effect on the displacement mechanisms for the orientation map at the same time.

What happens on the rotation side of the circuit of FIG. 18 is similar to what happens on the distance pulse side. The shift clock pulse $T_2$ which is offset in terms of time with respect to shift clock pulse $T_1$ and is passed to the input 75 of the AND-gate 76 is only able to pass to the output gate 67 if there is no distance and rotation pulse occuring at the same time at the NOR-gate 73. The phase shift of the shift clock pulse $T_2$ as compared to the shift clock pulse $T_1$ is achieved by a delay element 78.

Figure 18A:
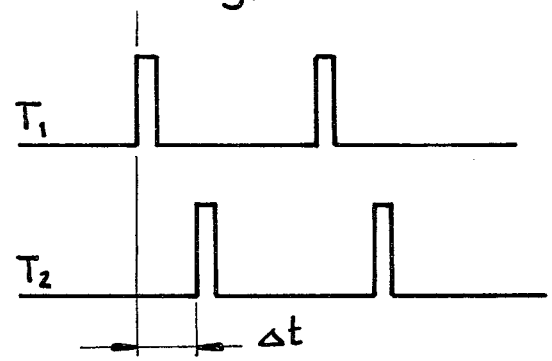
FIG. 18a is a pulse diagram for use in explaining the operation of the circuit of FIG. 18.

As already stated, the circuit of FIG. 18 prevents distance and rotation pulses being passed on at the same time by the output gates. The circuit of FIG. 18 also ensures however that when the two control pulses do occur at the same time not a single pulse is lost since all of the pulses are stored for an intermediate period in the counters associated with them. All of the pulses arriving at the input of the circuit of FIG. 18 are passed on by this circuit and in fact the distance pulse is passed on with the proviso that a shift clock pulse $T_1$ should appear at the gate 70 and the rotation pulse is passed on with the proviso that a shift clock pulse $T_2$ should appear at the gate 76. The time delay of the two shift clock pulses also contributes to the fact that pulses from the output gates 65 and 67 are not passed on at the same time. FIG. 18a shows the time displacement between the two clock pulses $T_1$ and $T_2$.

The circuits of FIGS. 16 to 18 are connected in respect of the rotation pulse between the receiver of the read device on the mass element and step motor and in respect of the distance pulse between the programmable divider and the electromagnet.

The suction air for the turntable and the lateral transport device is controlled for example by means of magnetic valves. The control of these magnetic valves takes place in synchronism with the rotation pulse control or in synchronism with the lateral pulse control respectively.

FIGS. 19 and 20 serve to explain the rotation and lateral displacement to which a street map is subjected by the turntable 11 and the lateral transport device 12 during travel in a vehicle. FIG. 19a shows the turntable 11, the lateral transport device 12, a raster whose lines 79 are in parallel to the longitudinal axis of the vehicle, and a portion 80 of a street map which is designated in the following, for the sake of simplicity as a street map in symbolic view. In FIG. 19a the street map 80 has not yet been placed on to the turntable 11 or the lateral transport device 12. The indicator or pointer 81 is designed to indicate that a source of light is present above the turntable 11 and produces a dot of light at the pivot point of the turntable 11.

In the example of FIG. 19 the turntable 11 is adjusted before the map is placed on to it with its zero marking to a mark which corresponds to the zero position of the mass element 1. Before the map 80 is placed on the turntable 11, the starting point is ascertained first of all and the journey starts from this starting point. The starting point is the point A on the street map in the example of FIG. 19.

When the map 80 is placed on to the turntable 11 the starting point A comes to rest over the pivot point of the turntable 11. This adjustment of the starting point A on the pivot point of the turntable is made easy by illuminating this pivot point.

If the map 80 rests over the pivot point of the turntable at its starting point A, then the map 80 is rotated so that its north direction comes to lie parallel with the raster lines 79. The north direction of the map 80 then points in the direction of the longitudinal axis of the vehicle. A further rotation of the map about the starting point A with the aid of the turntable 11 takes place afterwards and in fact takes place such that its north direction points in the true north direction. This rotation is achieved by bringing the angle position of the turntable into agreement with the angle position of the direction indicator 8. This takes place automatically by switching on the described rotation mechanism. This rotation of the map into the actual north direction is shown in FIG. 19c.

If it is desired to travel on the map 80 from the starting point A to B, then in the first instance travel is straight ahead to the point 82. Lateral displacement of the lateral transport device corresponding to this travel in a direction straight ahead is shown in FIG. 19d.

The view of FIG. 19e shows the arrival at point 82 and at the same time the change in direction of travel which has to occur at the point 82 if travel is to continue on the street from point 82 to point 83.

As is apparent from the description with reference to FIG. 18, the map 80 should be rotated before the journey after it has been placed on to the turntable so that its north direction points in the true north direction. This starting position of the map before the beginning of the journey is also shown by FIG. 20a. If according to this Figure we again travel from point A (starting point) to point 82 i.e., the first intersection, then in the first instance there is only a purely lateral movement since the vehicle does not have to change its direction on the journey from A to 82. FIG. 20b shows lateral displacement of the map 80 corresponding to the distance from A to 82. FIG. 20c shows the rotation of the map 80 in accordance with the change in direction of the vehicle at the point 82 if the vehicle swings at this point from the first street into the second street which leads from 82 to 83.

FIG. 20d shows the lateral displacement of the map 80 which takes place during the journey from 82 to 83. FIG. 20e shows the rotation of the map in accordance with the change in the direction of the vehicle in the direction B when it arrives at 83. Finally, FIG. 20f shows the vehicle arriving at the destination point B.

Figure 21:
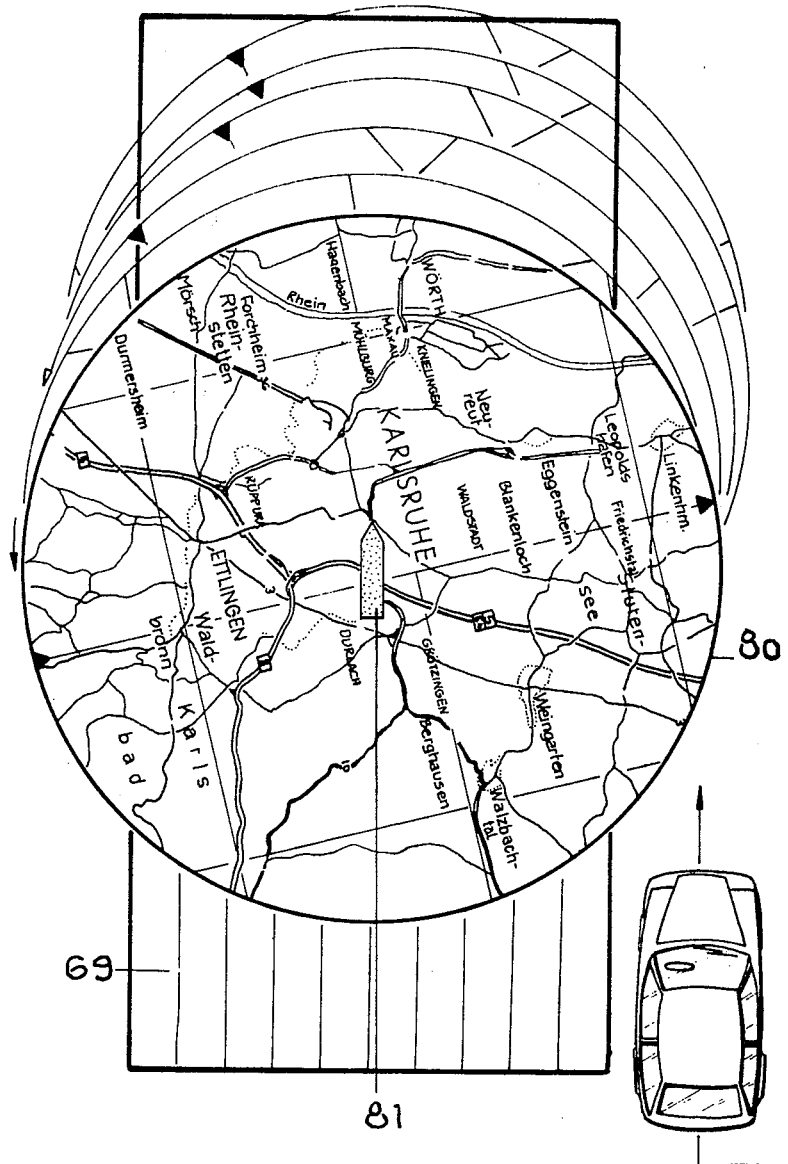

FIG. 21 shows a larger portion of the map (80) and the lateral displacement of this portion of the map by means of the lateral transport device.

It will be understood that the above description of the present invention is susceptible to various modification, changes and adaptations.

What is claimed is:

1. An arrangement mounted on a land vehicle for the purpose of orientation on journeys of the land vehicle comprising, in combination:
    first means for ascertaining the distance traveled by the vehicle;
    second means for ascertaining changes in direction of the vehicle, said second means including a direction indicator for determining changes in direction of the vehicle with said direction indicator being rigidly connected to said vehicle, and an inertial mass mounted in said vehicle to be substantially friction free so that it does not perform the changes in vehicle direction with the vehicle, said mass being disposed in said vehicle such that said direction indicator carries out rotary movements about the mass as the vehicle changes direction, with these rotary movements being a measure of the changes in vehicle direction; and,
    third means, responsive to output signals from said first and second means, for indicating the path traveled, including distance and changes of direction, and the current location of the vehicle, said third means including fourth means for supporting a map and for rotating the map corresponding to direction changes of the vehicle so as to always indicate the true heading and location of the vehicle on the map.

2. An arrangement according to claim 1, in which the distance covered by the vehicle is derived from the revolutions of one or more wheels of the vehicle.

3. An arrangement according to claim 1 and further comprising a friction-free bearing for the mass.

4. An arrangement according to claim 1 and further comprising a bearing for the mass which always ensures vertical setting of the axis of rotation of the mass independently of the lateral inclination of the vehicle and independently of the gradient travelled.

5. An arrangement according to claim 4 in which said bearing is a hemispherical bearing.

6. An arrangement according to claim 5 in which the pivot point of the hemispherical bearing and the centre of gravity of the mass are offset with respect to each other such that the axis of rotation of the mass swings by itself in a vertical direction due to the effect of gravity.

7. An arrangement according claim 1 in which said mass has a radiant division and a marking which determines its starting position for the purpose of establishing the relative rotary movement between the said mass and said direction indicator rigidly connected to the vehicle.

8. An arrangement according to claim 7 in which said direction indicator is formed such that it scans the angle markings of the mass electronically or optically.

9. An arrangement according to claim 1 and further comprising a device which converts the chanes in direction which have been ascertained and the distances which have been ascertained into polar coordinates or into cartesian coordinates.

10. An arrangement according to claim 1 wherein said third means includes a device which converts the distances which have been ascertained into values which correspond to the scale of the map used for orientation, such as a street map or a town plan.

11. An arrangement according to claim 10 wherein said first means includes a pulse generator which triggers pulses depending on the number of revolutions of a wheel of the vehicle, and said device includes a pulse divider which divides the pulses derived from the revotates with it, while when there is lateral displacement of the lateral transport device 12 there may only be a corresponding lateral displacement of the map in one direction.

Overall, the following applies to the suction processes. When the map is intentionally laterally displaced it may only be applied with suction by the lateral transport device 12 and not by the turntable 11. When the lateral transport device 12 is displaced laterally and the map is not able to be displaced with it, the map is under suction from the turntable 11 but not from the lateral transport device 12. When the turntable 11 rotates in order to rotate the map according to the direction change of the vehicle, the map may only be under suction from the turntable 11 but not from the lateral transport device 12. The lateral transport device 12 may therefore only apply suction when the electromagnet 14, 15 receives pulses for displacing the lateral transport device 12.

The electrical pulses with which the electromagnet 14, 15 is fed are derived from the rotations of the vehicle wheel for example. Thus a pulse may be triggered by each rotation of the wheel for example and this pulse cannot be passed directly to the electromagnet 14, 15 but rather care must be taken that there is a certain relationship between the number of pulses delivered by one or more vehicles wheels and the number of pulses arriving at the electromagnet 14, 15, this relationship taking into account the scale of the map and also other factors.

The following relationships apply:

$$a \cdot n = E \quad (1)$$

$$h \cdot m = E/M \quad (2)$$

$$h = a \cdot n/M \cdot m \quad (3)$$

where a is the circumference of the vehicle wheel, n is the number of wheel rotations made by the vehicle as it covers a certain distance, E is the distance covered by the vehicle, h is the stroke or lift of the lateral transport device, m is the number of pulses for the electromagnet, and M is the scale of the street map used.

If, for example, after the vehicle has covered a distance of 300 meters the electromagnet 14, 15 is acted upon by a pulse, than there is the following stroke or lift h per pulse for the lateral transport device 12:

$$h = a \cdot n/M = 300/M.$$

When using a street map with a scale ratio of 1:300 000, the lift or stroke h is $300/300\,000 = 10^{-3}$m $= 1$ mm for example.

FIG. 8 shows the device of FIG. 7 serving to displace the map in polar coordinates, in perspective view. This view shows above all the guidance of the lateral transport device 12 by the frame support 13. As FIG. 8 also shows, the turntable 11 is driven by a step motor 20 which, with a certain angular rotation of the direction indicator 8 relative to the mass element 1, receives a pulse which rotates the step motor 20 and also rotates the turntable 11 connected to thereto by the same angle by which the direction indicator 8 was previously rotated.

Whereas FIG. 5 merely shows how the direction change of the vehicle may be fixed by ascertaining the corresponding relative movement of the direction indicator 8 as compared to the mass element 1 which is stable in direction, FIGS. 9 to 13 relates to the problem of controlling the step motor 20 which, as stated above, has to perform angular rotations which are identical to the angular rotations of the direction indicator 8. Moreover, the step motor 20 always has to rotate in the same direction as the direction indicator 8 relative to the mass element 1, i.e. clockwise or oppositely of this direction of rotation.

This type of control may be carried out in various ways. One embodiment is shown by way of example by FIG. 9. In this embodiment, the mass element 1 is provided with an edge surface 21 having a punched tape coding 22 which is scanned by a punched tape reader. The punched tape reader comprises alight-emitting diode transmitter 23 for example and a photoelement receiver 24 for example. The punched tape reader 23, 24 rotates in the same way as the direction indicator 8 of FIG. 5 rotates about the mass element 1 when there is a change in the direction of the vehicle. The coding on the edge surface 21 of the mass element 1 must be such that a certain angular rotation of the punched tape reader 23, 24 results in a corresponding angular rotation of the turntable 11. If, by way of example, each angular rotation of the punched tape reader of 1° should result in an angular rotation of the turntable of 1° also, then 360 different codings would be required on the edge 21 of the mass element in order that a different coding should be present on each portion having an angle of 1°. 360 different codings necessitate a nine-position binary code which can be scanned with a punched tape reader having a 9-bit LED line as the transmitter and a nine-part photoelement line as the receiver 24. Scanning is effected by making the nine LEDs transmit light which is directed on to the punch hole coding. However, since the hole coding is different from one radian to the next, the photoelements on the receiving side are activated selectively depending on the respective coding present between the transmitter and receiver. This has the result that a special configuration of activated photoelements is associated with each radian. A nine-part phototransistor line of the following type: BPW 16/9 or BPW 17/9 serves as the photoreceiver.

FIG. 10 shows the nine-position binary code present on the edge surface 21 of the mass element 1 in enlarged form.

As FIG. 11 shows, a disc 25 is connected to the axle of the step motor 20 and carries out the same rotations as the turntable 11 and has the same coding (26) as the edge surface 21 of the mass element 1. This coding 26 is also scanned by a punched tape reader which is constructed in the same manner as the punched tape reader of FIG. 9 and comprises a light-emitting diode transmitter 27 and a photoelement receiver 28. A nine-position LED line is preferably used as the transmitter 27 and a nine-position photoelement line as the receiver 28 for this punched tape reader.

The two punched tape receivers 24 and 28 gives results which are compared to each other as indicated in FIG. 12 when the punched tape is read. If the two results are the same then the step motor 20 does not receive a pulse and the turntable 11 is not set in rotation either. There is no rotation only when both punched tape readers take up the same angle position with respect to the zero making, i.e. both in the angle position 10° for example. On the other hand, if one punched tape reader should take up the angle position 10° and the other punched tape reader the angle position 350°, then